(12) United States Patent
Diament et al.

(10) Patent No.: US 9,218,100 B2
(45) Date of Patent: Dec. 22, 2015

(54) METHOD AND SYSTEM FOR PARTITIONING ASSET MANAGEMENT PLUGINS

(75) Inventors: Judah M. Diament, Bergenfield, NJ (US); Grant J. Larsen, Littleton, CO (US); Arun K. Iyengar, Yorktown Heights, NY (US); Thomas A. Mikalsen, Cold Spring, NY (US); Isabelle M. Rouvellou, New York, NY (US); Ignacio Silva-Lepe, Putnam Valley, NY (US); Revathi Subramanian, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1481 days.

(21) Appl. No.: 12/717,366

(22) Filed: Mar. 4, 2010

(65) Prior Publication Data

US 2011/0219311 A1  Sep. 8, 2011

(51) Int. Cl.
*G06F 3/00* (2006.01)
*G06F 3/048* (2013.01)
*G06F 15/173* (2006.01)

(52) U.S. Cl.
CPC .............. *G06F 3/048* (2013.01); *G06F 15/173* (2013.01)

(58) Field of Classification Search
CPC .................................. G06F 3/00; G06F 3/048
USPC .................................. 715/736, 738; 709/226
See application file for complete search history.

(56) References Cited

U.S. PATENT DOCUMENTS

| | | | |
|---|---|---|---|
| 6,366,916 B1 * | 4/2002 | Baer et al. | |
| 6,437,804 B1 * | 8/2002 | Ibe et al. | 715/736 |
| 6,763,377 B1 * | 7/2004 | Belknap et al. | 709/223 |
| 6,871,345 B1 * | 3/2005 | Crow et al. | 717/175 |
| 6,950,850 B1 * | 9/2005 | Leff et al. | 709/203 |
| 8,296,801 B2 * | 10/2012 | Takagi et al. | 725/44 |
| 2003/0115442 A1 * | 6/2003 | Whitney | 713/1 |
| 2005/0268298 A1 * | 12/2005 | Hunt et al. | 718/1 |
| 2006/0053163 A1 * | 3/2006 | Liu et al. | 707/104.1 |
| 2008/0320022 A1 * | 12/2008 | Owen et al. | 707/101 |
| 2011/0213866 A1 * | 9/2011 | Yoshimura et al. | 709/223 |
| 2013/0179882 A1 * | 7/2013 | Lemay et al. | 718/1 |

FOREIGN PATENT DOCUMENTS

WO   WO/00/48073 A1   8/2000

* cited by examiner

*Primary Examiner* — Amy Ng
*Assistant Examiner* — Meseker Takele
(74) *Attorney, Agent, or Firm* — Cahn & Samuels, LLP

(57) ABSTRACT

An embodiment of the invention includes a system for partitioning asset management plugins. The system includes an application program interface for performing basic CRUD functions on assets having multiple asset types. At least one plugin having plugin components is provided, wherein the plugin manages at least one asset having a specific asset type (of the multiple asset types). The plugin components include a CRUD component, a state component, an actions component, and/or a view component. The system further includes plugin containers for hosting the plugin components, the plugin containers include at least one client-side plugin container and at least one server-side plugin container. The plugin components are partitioned and distributed from the plugin components to the plugin containers by a plugin server based on capabilities of the client.

28 Claims, 4 Drawing Sheets

METHOD AND SYSTEM FOR PARTITIONING ASSET MANAGEMENT PLUGINS

BACKGROUND

The present invention relates to asset management plugins, and more specifically, to systems, methods, and computer program products for partitioning asset management plugins.

An asset is a collection of artifacts that provide a solution to a requirement or business need. Assets may include artifacts of all different types, including source code, binary/executable components, models, and/or design or requirements documents. An asset management system facilitates the development, deployment and (re)use of collaborative software assets, helping IT organizations deliver innovative IT solutions while controlling costs.

An asset is often interacted with in multiple contexts. Depending on the asset type, these interactions may include planning time, development time, deployment time, and end user/reporting. For example, a project manager defines requirements and/or asset types (planning time), followed by interactions by developers and team software development systems (development time). Interactions by deployers and deployment systems (deployment time) and end user views and/or manipulations (end user/reporting) also involve asset interaction. In another example, an analyst creates a model; and, a developer uses the model when developing his/her application. The developer subsequently deploys the model as part of the application; and, an end user discovers the model and views and/or edits it with a tool/user interface. Because of the wide range of asset utilization, a given asset type may be manipulated across server topologies (e.g., cloud-based services, client-server, single node) and/or across client types (e.g., Eclipse (www.eclipse.org), browser, and/or service oriented clients (i.e. applications running on a different server)).

SUMMARY

An embodiment of the invention includes a system for partitioning asset management plugins. The system includes an application program interface (API) for clients to perform basic create, read, update and delete (CRUD) functions on assets having multiple asset types. The API also enables clients to perform basic state transition functions on the assets having multiple asset types. At least one plugin having plugin components is provided, wherein the plugin manages at least one asset having a specific asset type of the multiple asset types. The plugin components include one or more of a CRUD component, a state component, an actions component, and/or a view component.

More specifically, the CRUD component overrides one or more of the generic CRUD functions that can be performed on the asset having the specific asset type. This involves replacing, extending, and/or removing one or more of the generic CRUD functions. The state component overrides one or more of the generic state transition functions that can be performed on the asset having the specific asset type. Specifically, the state component may allow or prevent a state transition on the asset having the specific asset type, or execute some asset type specific logic after a state transition has occurred. Moreover, the state component may replace, extend, and/or remove one or more of the generic CRUD functions after a state transition of the asset having the specific asset type. The actions component provides specialized high-level actions for the asset having the specific asset type. Examples of high-level actions for the asset include deploying an executable artifact, transforming artifacts, and/or performing a type-specific analysis. The view component provides a visual rendering of the asset having the specific asset type and/or a user interface to manipulate the asset.

The system further includes plugin containers for hosting the plugin components and the API. The plugin containers include at least one client-side plugin container and at least one server-side plugin container. A plugin server partitions and distributes the plugin components to the plugin containers based on capabilities of the client. In at least one embodiment, the plugin components are hosted within more than one of the plugin containers, wherein the plugin server manages interactions between the plugin components.

At least one embodiment of the invention provides a method, which includes hosting at least one plugin having one or more plugin components on a plugin server. The plugin components are partitioned and distributed from the plugin server to client-side plugin container(s) and/or server-side plugin container(s). Generic operational functions are performed on assets having multiple asset types with an asset management system. At least one asset having a specific asset type is managed with at least one plugin component of the plugin selected based on the specific asset type of the asset being managed.

Another embodiment of the invention provides a computer program product including first, second, third, and fourth program instructions stored on a computer readable storage medium. More specifically, the first program instructions host at least one plugin having one or more plugin components on a plugin server. The second program instructions partition and distribute the plugin components from the plugin server to client-side plugin container(s) and/or server-side plugin container(s). The third program instructions perform generic operational functions on assets having multiple asset types with an asset management system. The fourth program instructions manage one or more assets having a specific asset type with at least one plugin component of the plugin selected based on the specific asset type of the asset being managed.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention includes systems, methods, and computer program products for executing asset management logic and asset management user interfaces. An asset management plugin specification (or plugin) is provided, which includes create, read, update and delete (CRUD) handlers, state handlers, high level actions, and user interfaces/views (also referred to herein as the "plugin components") to manage a specific asset type. A system which supports execution of asset management plugins is also provided, where the plugin components are executed across 1 . . . N plugin containers in a distributed environment.

Figure 1:
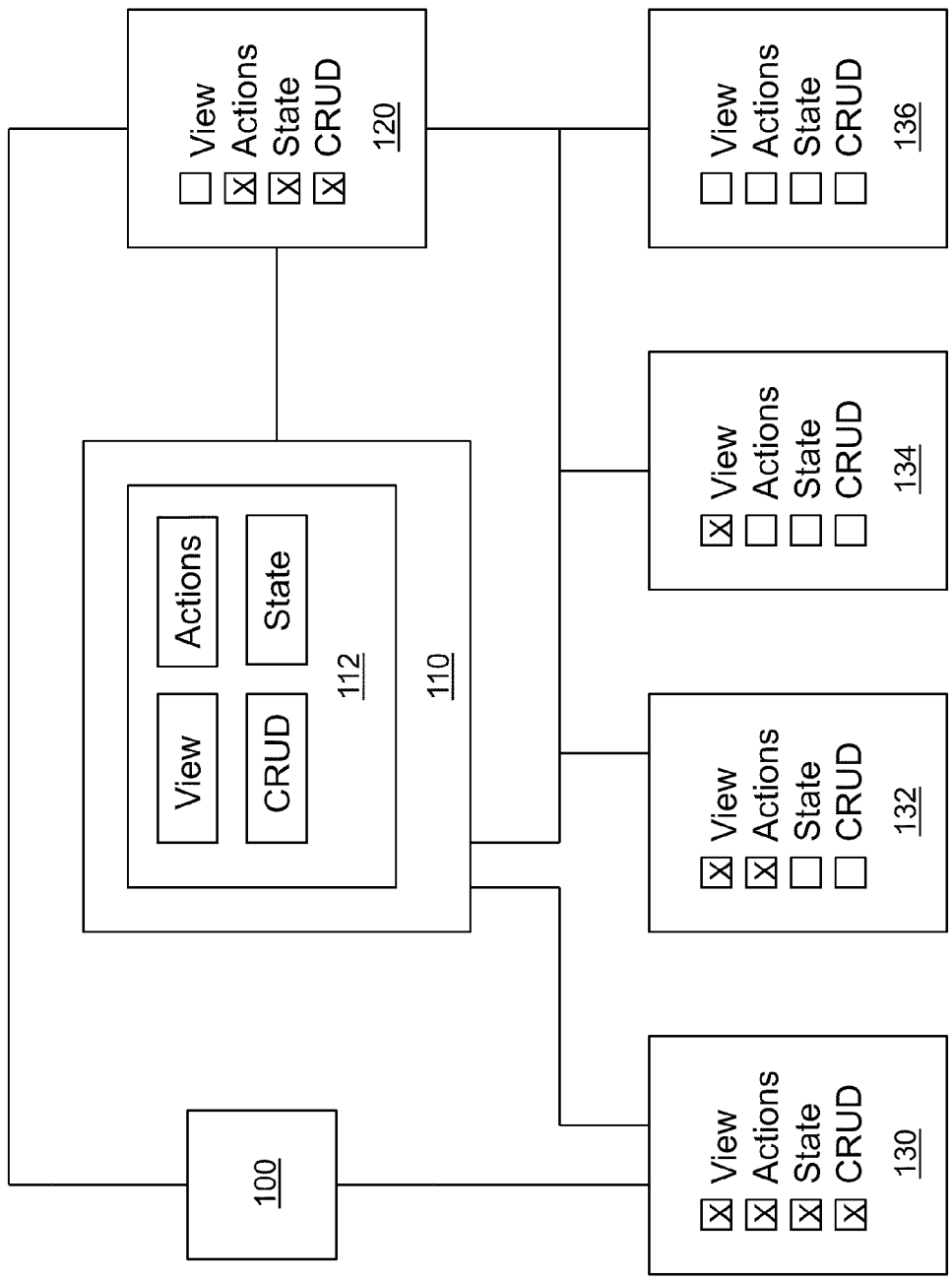
FIG. 1 illustrates a system for partitioning asset management plugins according to an embodiment of the invention.

More specifically, as illustrated in FIG. 1, at least one embodiment of the invention includes an asset management system 100, which provides a generic asset CRUD application program interface (API). The API is provided to plugin components (i.e., CRUD components, state components, actions components, and view components) by server-side and client-side plugin containers (i.e., plugin containers 120 and 130-134) to facilitate generic CRUD and other common functions on assets. An external client 136 does not have a plugin container running. The external client 136 remotely calls asset management basic functions and/or plugin functions that are running on the asset management system 100 and plugin containers 120. In at least one embodiment of the invention, a plugin container runs inside a web browser, wherein the client is a thin client, not an external client. The asset management system 100 also provides support for asset definition libraries, which define an asset information model. The asset definition libraries include asset type definitions and schemas, asset relationship types that can exist between assets of given types, and asset states, i.e., the set of named states for a given asset type. Additionally, the asset management system 100 discovers and manages supporting asset management plugins in a plugin server 110. The "plugin server" as used in this document means a processor running code providing the functionality described in this disclosure for the plugin server. In at least one embodiment of the invention, the API, asset management system 100, and plugin server 110 are co-located on a single machine. In another embodiment, plugin containers 120 and 130-134 are also co-located on the same machine.

The asset management system 100 is extended by the asset management plugins, which declaratively add asset-type specific functionality to the asset management system 100. As described more fully below, the asset management plugins include CRUD components, state components, actions components, and view components. The server-side plugin container 120 and client-side plugin containers 130-134 are provided for hosting the plugin components. Specifically, the plugin components are stored within the plugin server 110, wherein the plugin server 110 is connected to one or more plugin containers (e.g., client-side plugin container 130) that can be remotely located from the plugin server 110. The server-side plugin container 120 and/or one or more of the server-side plugin containers 130-134 host one or more of the plugin components from the plugin server 110, i.e., the code comprising one or more plugin components is copied to, and executed within, the plugin container.

The plugin server 110 distributes the plugin components to the plugin containers, and mediates interactions between plugin components that span multiple plugin containers. The plugin server 110 dynamically and automatically distributes parts of the asset management plugins across the plugin containers 120, 130-134 at runtime, as dictated by client capabilities and system deployment topology. Moreover, the plugin server 110 facilitates communication between the plugin components across the tiers into which they were distributed. More specifically, as illustrated in FIG. 1, the plugin server 110 distributes plugin components to the server-side plugin container 120, the client-side plugin container 130 (fat client), the client-side plugin container 132 (thick client), and the client-side plugin container 134 (thin client).

At least one embodiment of the invention includes an asset management plugin specification 112 in the plugin server 110. A plugin declares the type of asset (as defined in an asset definition library) it manages, as well as the CRUD components, state components, actions components, and view components. The asset management plugin specification 112 leverages standard asset API's provided by the asset management system 100 and the plugin containers 120 and 130-134.

In at least one embodiment, the plugin specification 112 includes scripts that implement the functions provided by the plugin components. Scripts are defined as part of a specific plugin component and/or outside any specific component. Scripts defined outside any specific component may be invoked by the scripts that are defined within any component in the plugin specification. In another embodiment, a script is included at the beginning of a plugin component (e.g., the actions component). This script is callable by any function on that plugin component, but not by functions in other plugin components unless the function is included in an "export" attribute defined on the plugin component specification. For example, a script included under the specification of the CRUD component can only be called inside the CRUD component.

The CRUD components react to CRUD events on assets of a given type. Basic CRUD logic is handled by the asset management system 100. The CRUD components, on the other hand, handle type-specific logic. For example, a CRUD component validates conformance to schemas or archive structures, provides security vetting, and dependency resolution. In at least one embodiment, an asset management plugin defines a pre- and/or post-CRUD event handlers for each CRUD event. For each CRUD event, there is a response object that will be returned to the initiator of the event. The response object includes a status that indicates to the client the status of the CRUD event, as embodied, for example, in the HTTP response codes. The response object also includes content which conveys any additional relevant information to the client.

The state components react to any changes in the state of assets of the given type. In at least one embodiment, the state components are triggered before or after transitioning to a given state. In another embodiment, the state components are triggered at fixed intervals when an asset is in a given state. State transitions may cascade to/from related assets. Cascading may occur independent of whether a plugin exists for managing the asset types of the related assets.

The actions components provide higher level actions one can take on assets of the given type. In at least one embodiment, the higher level actions include additional logic and/or a series of CRUD calls, which define API function beyond generic CRUD events for the given asset type. Examples of higher level actions include: deploying an executable artifact; transforming artifacts (e.g., transforming a source artifact into an executable artifact; transforming an artifact into a different format or schema); and, performing a type specific analysis. In at least one embodiment, the higher level actions are limited to being available only while an asset is in a given state. For example, the "deployAction" is only available when the asset is in the "module:states:production" state.

The actions components are accessible directly or by uniform resource locator (URL). Direct access, via function calls, accesses the actions components in clients with asset management plugin runtimes (e.g., Eclipse, web browser). When accessed by URL, an example of the URL is "http://

[plugin container web root]/[assetType]/[functionName]". The text in the URL enclosed in "[ ]" is an example of a variable to be replaced by actual values in an implementation according to at least one embodiment of the invention. For instance, "http://www.acme.com/plugins/marketingAsset/getMarketSegmentSummary" is an example of a URL. Named parameters/parts/headers of the call are matched to named parameters of the function. Moreover, the higher level actions specify which functions may be called by clients by listing the function names in an "export" attribute, which is defined on the actions component.

The view components enable asset-type specific visual rendering and human interaction. For example, in at least one embodiment, the view components render data assets as graphs and retrieve and render media/data that are URL referenced by the asset. In another embodiment, the view components support type specific editing (e.g., hosted development tools, WYSIWIG (what-you-see-is-what-you-get) editors, and/or flow editors). In a view component, a developer specifies the user interface using, for example, HTML, CSS, and JavaScript, which can be rendered in virtually all client environments. The code in the view component has direct access to the functions of the CRUD component and exported functions of the actions component.

Figure 2:
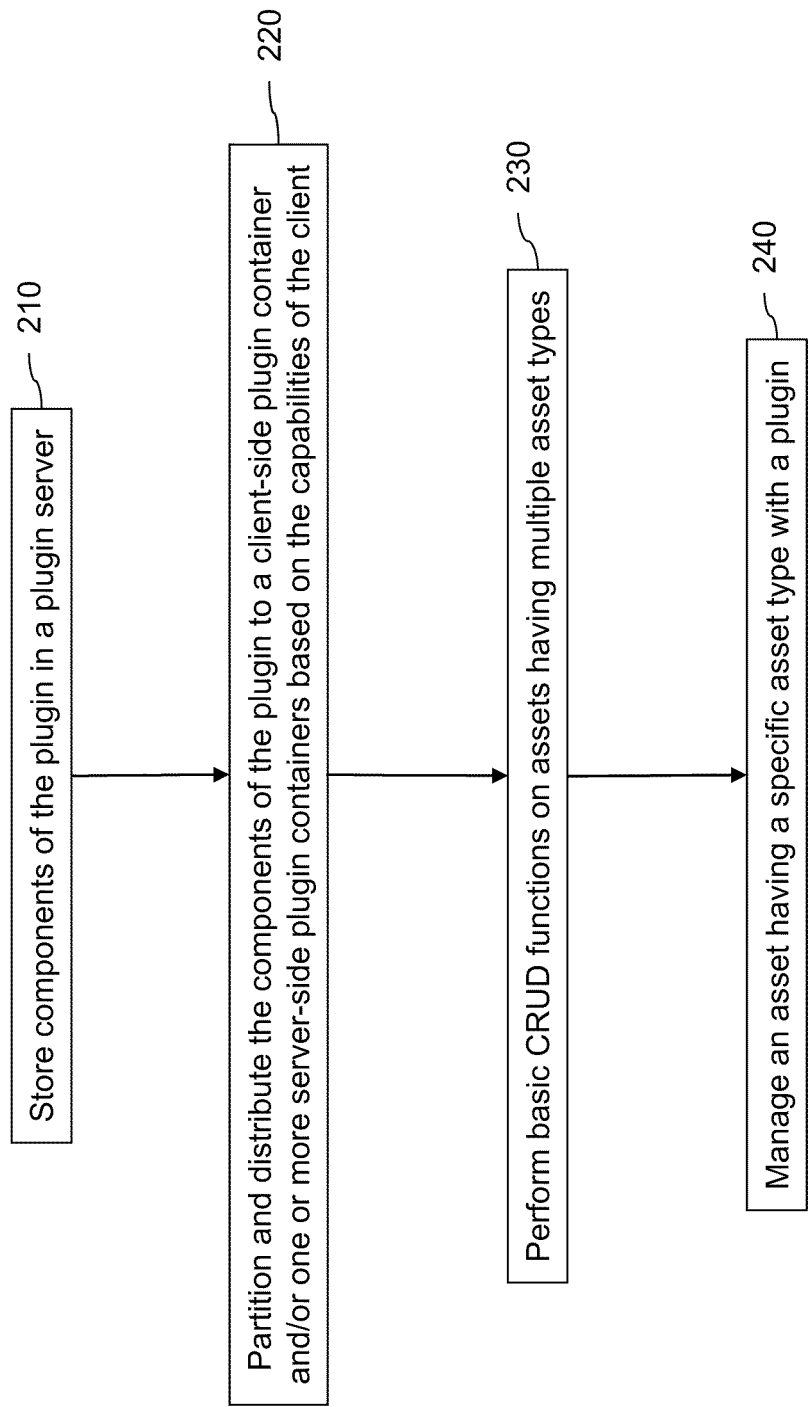
FIG. 2 illustrates a method for partitioning asset management plugins according to an embodiment of the invention.
Figure 3:
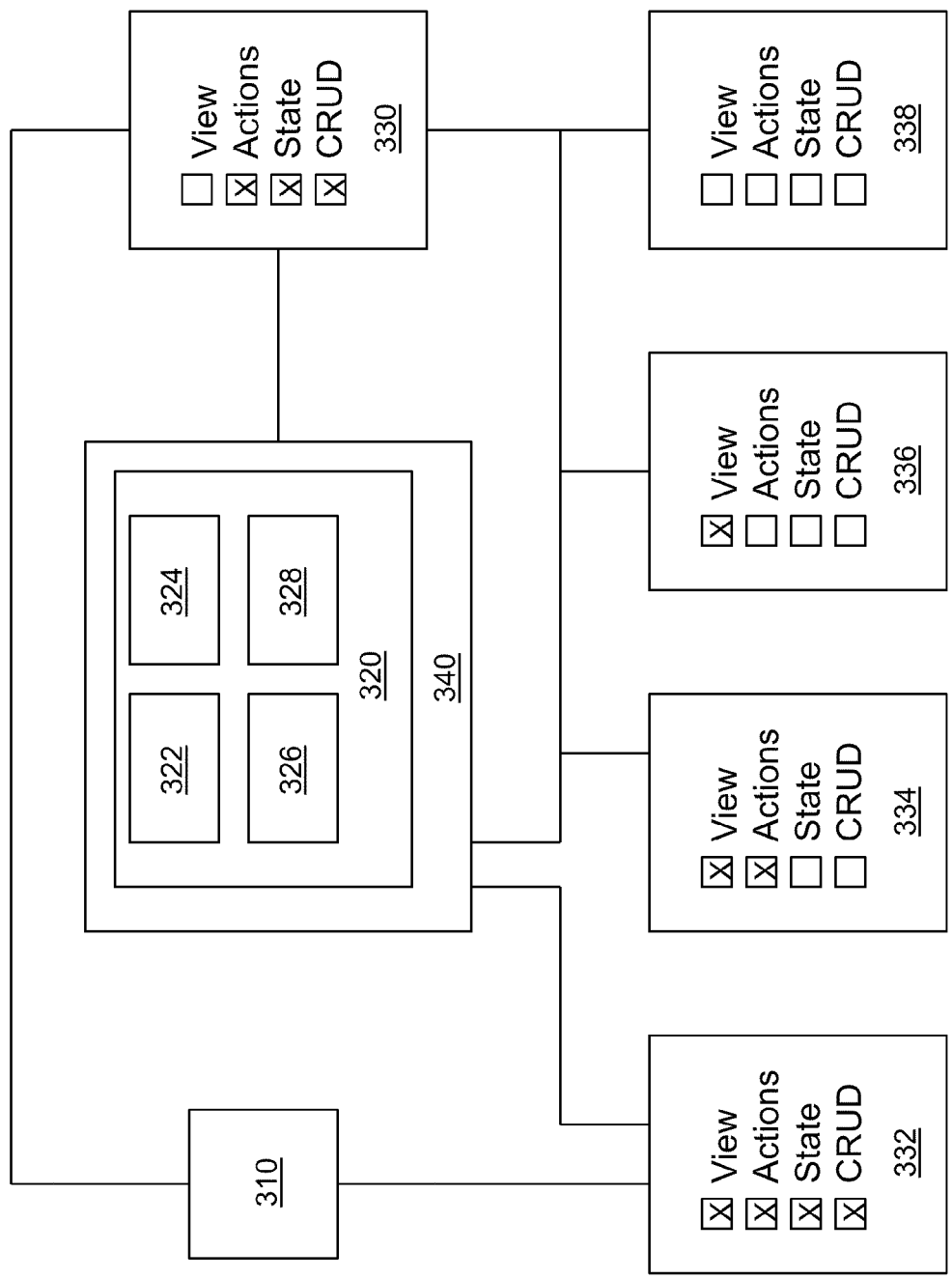
FIG. 3 illustrates a system for partitioning asset management plugins according to another embodiment of the invention.

FIG. 2 illustrates a method for partitioning asset management plugins according to an embodiment of the invention. A plugin 320 having plugin components 322-328 are hosted in a plugin server 340 (210). The plugin components 322-328 are partitioned and distributed from the plugin server 340 to a server-side plugin container 330 and/or one or more client-side plugin containers 332-336 based on the capabilities of the client (220). As described above, the plugin server dynamically and automatically distributes parts of the asset management plugins across the asset management system at runtime, as dictated by client capabilities and system deployment topology. Moreover, the plugin server facilitates communication between the plugin components across the tiers into which they were distributed. More specifically, in at least one embodiment, two or more of the plugin components 322-328 are hosted on multiple plugin containers 330-336. For example, as illustrated in FIG. 3, the actions component 326 is hosted on plugin containers 330, 332, and 334. The plugin server 340 manages interactions between the plugin components that are hosted on multiple plugin containers. An external client 338 does not have a plugin container running. The external client 338 remotely calls asset management basic functions and/or plugin functions that are running on the asset management system and plugin containers 330-336. In at least one embodiment of the invention, a plugin container runs inside a web browser, wherein the client is a thin client, not an external client.

Generic operational functions (also referred to herein as "CRUD functions" (e.g., create, read, update, and delete functions)) are performed on assets having multiple asset types (230) by an asset management system, which may be provided by an application program interface (API). The asset management system provides basic state transition functions to the assets having multiple asset types. As illustrated in FIG. 3, a system for partitioning asset management plugins according to an embodiment of the invention includes an API 310 connected to plugin containers 330 and 332.

As described above, the API 310 is extended by the asset management plugin 320, which declaratively adds asset-type specific functionality. More specifically, at least one asset having a specific asset type (of the multiple asset types) is managed with at least one plugin component 322-328 of the plugin 320 selected based on the specific asset type of the asset being managed (240). In at least one embodiment, the plugin 320 includes a CRUD component 322, a state component 324, an actions component 326, and a view component 328.

The managing of the asset having the specific asset type includes receiving a call from a client through the API 310 of the asset management system to perform a generic operational function on an asset having a specific asset type. If the asset is of an asset type having a plugin, at least one plugin component 322-328 of the plugin 320 associated with the asset type of the asset is invoked to perform the generic operational function in place of or extending the generic operational function of the asset management system. Otherwise, the asset management system performs the generic operational function.

The managing of the asset having the specific asset type further includes overriding the generic operational functions used for interacting with an asset with at least one plugin component 322-328. This involves replacing, extending, and/or removing at least one of the basic CRUD functions. In at least one embodiment, as described above, an asset management plugin defines a pre- and/or post-CRUD event handlers for each CRUD event. For each CRUD event, there is a response object that will be returned to the initiator of the event. The response object includes a status that indicates to the client the status of the CRUD event, as embodied, for example, in the HTTP response codes. The response object also includes content which conveys any additional relevant information to the client.

The managing of the asset having the specific asset type further includes overriding the basic state transition functions of the asset having the specific asset type with the state component 324. In at least one embodiment, the overriding of the basic state transition functions includes allowing or preventing (i.e., vetoing) a state transition of the asset having the specific asset type or executing some asset type specific logic after a state transition has occurred. In another embodiment, the overriding of the basic state transition functions includes replacing, extending, and/or removing at least one of the basic CRUD functions after a state transition of the asset having the specific asset type. As described above, in at least one embodiment, the state components are triggered before or after transitioning to a given state. In another embodiment, the state components are triggered at fixed intervals when an asset is in a given state. State transitions may cascade to/from related assets. Cascading may occur independent of whether a plugin exists for managing the asset types of the related assets Additionally, the managing of the asset having the specific asset type includes providing specialized high-level actions for the asset having the specific asset type with the actions component 326. In at least one embodiment, examples of the specialized high-level actions include deploying an executable artifact, transforming artifacts, and/or performing a type-specific analysis. In at least one embodiment, the specialized higher level actions are limited to being available only while an asset is in a given state. For example, the "deployAction" is only available when the asset is in the "module:states: production" state. A state is the condition of an asset, as with respect to its contents or attributes and how they pertain to the business need which the asset comes to address.

The managing of the asset having the specific asset type also includes providing a visual rendering of the asset having the specific asset type with the view component 328. For example, in at least one embodiment, the view component 328 renders data assets as graphs and retrieves and renders media/data that are URL referenced by the asset. In another embodiment, the view components support type specific editing (e.g., hosted developmental tools, WYSIWIG (what-you-see-is-what-you-get) editors, and/or flow editors). In a view section, a developer specifies the user interface using, for example, HTML, CSS, and JavaScript, which can be rendered in virtually all client environments. The code in the view section has direct access to the functions of the CRUD component 322 and exported functions of the actions component 326.

The following are examples of the functional use of a plugin (not its partitioning or the aspects of the system that are used) by Fred and Bob.

Fred, a member of his company's infrastructure team, has created a plugin to their asset management system to manage assets that are web applications. When a new web application is uploaded (i.e. "Create" in CRUD), the plugin's CRUD component scans it for viruses. If no viruses are found, the "Create" is allowed and the application is stored as a new asset. The View component of the plugin provides a browser UI to access the deploy function in its Action component. The deploy function reuses the company's web deployment infrastructure which provides web services to start and stop web applications, and to report usage statistics. The view component also provides an HTML UI for viewing and graphing the usage statistics of a deployed web application.

Bob, a web developer, creates a new web application that is virus free and is added as a new asset. Bob accesses the plugin's View using his web browser and clicks on "deploy". The deploy function does 2 things: 1) changes the application's state in the asset management system from "created" to "deploying", and 2) calls the infrastructure's deployment web service. When the state transition from "create" to "deploying" is requested, the system calls Fred's plugin's State component to approve the state transition. The state component first checks if Bob has deployment permissions. If he doesn't, the state transition is prevented and the deploy function fails. If he does have deployment permissions, the plugin signals a system administrator for deployment approval. If the system administrator approves it, the state transition is allowed, and the deploy function calls the deployment web service to deploy the application. Once deployment completes, the state of the asset is changed to "deployed". Once the application is deployed, Bob can access the View component to view and graph the usage statistics of his deployed web application provided by the deployment infrastructure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
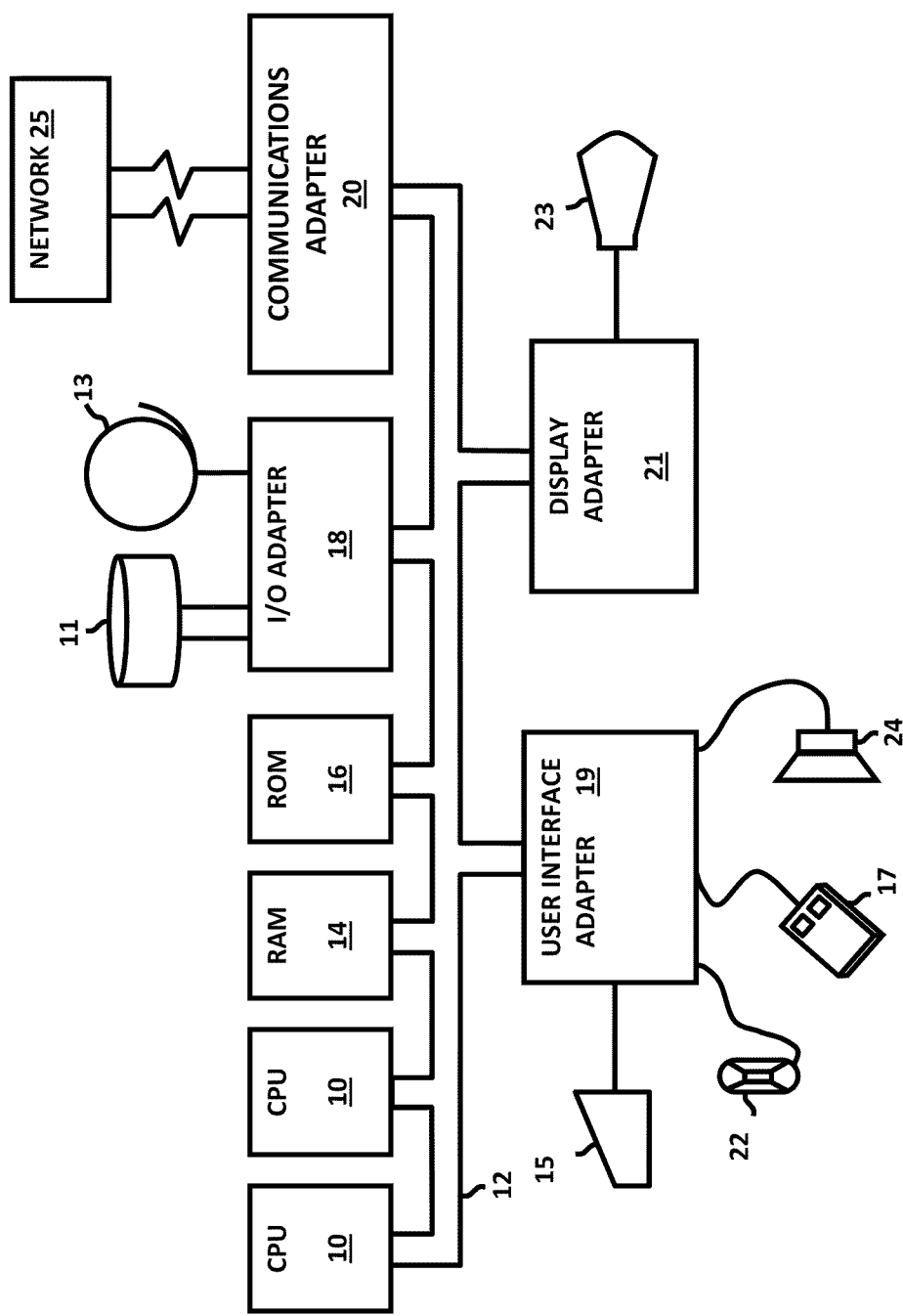
FIG. 4 illustrates a computer program product according to an embodiment of the invention.

Referring now to FIG. 4, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus for partitioning plug-ins in a client-server asset management environment, said apparatus comprising:
   an asset management system for storing assets having multiple asset types;
   an application program interface for performing generic create, read, update and delete (CRUD) functions on assets, plugin containers for hosting at least one plugin component of at least one plugin that manages at least one asset type for interacting with said asset management system, the plugin containers including at least one client-side plugin container, and at least one server-side plugin container a processor connected between said plugin containers and said asset management system, said processor partitions and distributes plugin components from the at least one plugin into at least one plugin container said create, read, update and delete component performs replaces, extends, and removes the generic create, read, update and delete functions provided by said application program interface;
   said state component does: prevents a state transition of the asset having the specific asset type managed by the plugin, executes some asset type specific Ionic after a state transition has occurred on an asset having the specific asset type managed by the plugin, and performs replaces, extends, and removes the, generic create, read, update and delete functions after a state transition of the asset having the specific asset type associated with the plugin managed by the plugin;
   said actions component provides specialized high-level actions for the asset having the specific asset type managed by the plugin, the specialized high-level actions including deploying an executable artifact, transforming artifacts, and performing a type-specific analysis; and
   Said view component provides a visual rendering of the asset having the specific asset type managed by the plugin.

2. The apparatus according to claim 1, wherein the processor partitions the plugin components to the plugin containers dynamically based on capabilities of a client.

3. The apparatus according to claim 1, wherein the plugin components include a CRUD component for overriding the generic CRUD functions used for interacting with an asset having the specific asset type associated with one of the at least one plugins, and
   the CRUD component of the plugin performs at least one of replaces, extends, and removes at least one of the generic CRUD functions of the application program interface.

4. The apparatus according to claim 1, wherein said application program interface provides generic state transition functions to the assets, and
   the plugin components include a state component for overriding the generic state transition functions of the asset having the specific asset type associated with one of the at least one plugins.

5. The apparatus according to claim 4, wherein said state component of the plugin prevents a state transition of the asset having the specific asset type associated with the plugin.

6. The apparatus according to claim 4, wherein said state component of the plugin allows a state transition of the asset having the specific asset type associated with the plugin.

7. The apparatus according to claim 4, wherein said state component of the plugin executes at least one asset type specific action after a state transition has occurred on an asset having the specific asset type associated with the plugin.

8. The apparatus according to claim 4, wherein said state component of the plugin does at least one of replaces, extends, and removes at least one of the generic CRUD functions after a state transition of the asset having the specific asset type associated with the plugin.

9. The apparatus according to claim 1, wherein the plugin components include an actions component for providing specialized high-level actions for the asset having the specific asset type associated with the plugin.

10. The apparatus according to claim 9, wherein the specialized high-level actions include at least one of deploying an executable artifact, transforming artifacts, and performing a type-specific analysis.

11. The apparatus according to claim 1, wherein the plugin components include a view component for providing at least one of
   a visual rendering of the asset having the specific asset type associated with the plugin,
   a user interface for interacting with the asset having the specific asset type associated with the plugin, and
   a user interface that assists users use additional actions provided by an action component of the plugin for the asset having the specific asset type associated with the plugin.

12. The apparatus according to claim 1, wherein the plugin components of the plugin are hosted within more than one of the plugin containers,
   the plugin containers provide said application program interface to the plugin components, and
   the processor mediates interactions between the plugin components hosted within more than one of the plugin containers.

13. A system comprising:
   an application program interface for performing generic create, read, update and delete functions on assets having multiple asset types;
   at least one plugin having plugin components, the plugin manages at least one asset type, the plugin components including:
      a create, read, update and delete component,
      a state component,
      an actions component, and
      a view component;
   plugin containers for hosting the plugin components, the plugin containers including
      at least one client-side plugin container of at least one client and
      at least one server-side plugin container; and
   a processor for dynamically partitioning the plugin components to the plugin containers based on capabilities of the at least one client,
   said create, read, update and delete component performs replaces, extends, and removes the generic create, read, update and delete functions provided by said application program interface;
   said state component does:
      prevents a state transition of the asset having the specific asset type managed by the plugin,
      executes some asset type specific logic after a state transition has occurred on an asset having the specific asset type managed by the plugin, and
      performs replaces, extends, and removes the generic create, read, update and delete functions after a state transition of the asset having the specific asset type associated with the plugin managed by the plugin;
   said actions component provides specialized high-level actions for the asset having the specific asset type managed by the plugin, the specialized high-level actions including deploying an executable artifact, transforming artifacts, and performing a type-specific analysis; and
   said view component provides a visual rendering of the asset having the specific asset type managed by the plugin.

14. The system according to claim 13, wherein said state component is capable of:
   allows a state transition of the asset having the specific asset type managed by the plugin,
   executes some asset type specific logic after a state transition has occurred on an asset having the specific asset type managed by the plugin, and
   performs replaces, extends, and removes the generic create, read, update and delete functions after a state transition of the asset having the specific asset type managed by the plugin.

15. The system according to claim 13, wherein the plugin components of the plugin are hosted within more than one of the plugin containers, and
   the processor manages interactions between the plugin components hosted within more than one of the plugin containers.

16. A method comprising:
   hosting at least one plugin having at least one plugin component on a processor;
   partitioning and distributing the at least one plugin component from the processor to at least one of at least one client-side plugin container and at least one server-side plugin container;
   performing generic operational functions on assets having multiple asset types with an asset management system; and
   managing at least one asset having a specific asset type with at least one plugin component of the plugin selected based on the specific asset type of the asset being managed,
   replacing, extending, and removing generic create, read, update and delete functions provided by an application program interface;
   preventing a state transition of the asset having the specific asset type managed by the plugin,
   executing some asset type specific logic after a state transition has occurred on an asset having the specific asset type managed by the plugin, and
   replacing, extending, and removing the generic create, read, update and delete functions after a state transition of the asset having the specific asset type associated with the plugin managed by the plugin;
   providing specialized high-level actions for the asset having the specific asset type managed by the plugin, the specialized high-level actions including deploying an executable artifact, transforming artifacts, and performing a type-specific analysis; and providing a visual rendering of the asset having the specific asset type managed by the plugin.

17. The method according to claim 16, wherein managing includes
receiving a call from a client through an application program interface of said asset management system to perform a generic operational function on an asset having a specific asset type,
determining if the asset is of an asset type having a plugin, and
invoking at least one plugin component of the plugin associated with the asset type of the asset to perform the generic operational function in place of or extending the generic operational function of the asset management system, otherwise the asset management system performs the generic operational function.

18. The method according to claim 16, wherein said partitioning and distributing is done dynamically based on capabilities of a client.

19. The method according to claim 16, wherein said managing of the asset having the specific asset type includes overriding at least one of the generic operational functions used for interacting with an asset with at least one plugin component.

20. The method according to claim 16, further comprising providing basic state transition functions to the assets having multiple asset types with the asset management system, and
wherein said managing of the asset having the specific asset type includes overriding with at least one plugin component the basic state transition functions of the asset.

21. The method according to claim 20, wherein said overriding of the basic state transition functions includes preventing a state transition of the asset having the specific asset type being managed with the plugin.

22. The method according to claim 20, wherein said overriding of the basic state transition functions includes allowing a state transition of the asset having the specific asset type being managed with the plugin.

23. The method according to claim 20, further comprising executing at least one asset type specific action after a state transition has occurred on an asset having the specific asset type with a state component of the plugin associated with the specific asset type being managed with the plugin.

24. The method according to claim 20, wherein said overriding of the basic state transition functions includes at least one of replacing, extending, and removing at least one of the generic operational functions after a state transition of the asset having the specific asset type being managed with the plugin.

25. The method according to claim 16, wherein said managing of the asset having the specific asset type includes providing specialized high-level actions for the asset.

26. The method according to claim 25, wherein the specialized high-level actions include at least one of deploying an executable artifact, transforming artifacts, and performing a type-specific analysis.

27. The method according to claim 16, wherein said managing of the asset having the specific asset type includes providing at least one of
a visual rendering of the asset having the specific asset type associated with the plugin,
a user interface for interacting with the asset having the specific asset type associated with the plugin, and
a user interface that assists users use additional actions provided by an action component of the plugin for the asset having the specific asset type associated with the plugin.

28. The method according to claim 16, further comprising managing interactions between the plugin components within the multiple client-side plugin containers and server-side plugin containers with the processor, and
wherein said partitioning and distributing of the plugin components includes hosting the plugin components within multiple client-side plugin containers and server-side plugin containers.

* * * * *